United States Patent
Lin et al.

(10) Patent No.: US 10,569,315 B2
(45) Date of Patent: Feb. 25, 2020

(54) TREATMENT METHOD FOR RESOURCE RECYCLING OF HEXAVALENT CHROMIUM-CONTAINING RESIDUES

(71) Applicant: South China University of Technology, Guangdong (CN)

(72) Inventors: Zhang Lin, Guangdong (CN); Weizhen Liu, Guangdong (CN); Xueming Liu, Guangdong (CN); Wencong Rong, Guangdong (CN)

(73) Assignee: South China University of Technology, Guangdong (CN)

( * ) Notice: Subject to any disclaimer, the term of this patent is extended or adjusted under 35 U.S.C. 154(b) by 0 days.

(21) Appl. No.: 16/074,104

(22) PCT Filed: Dec. 7, 2016

(86) PCT No.: PCT/CN2016/108757
§ 371 (c)(1),
(2) Date: Jul. 31, 2018

(87) PCT Pub. No.: WO2018/000730
PCT Pub. Date: Jan. 4, 2018

(65) Prior Publication Data
US 2019/0284661 A1    Sep. 19, 2019

(30) Foreign Application Priority Data
Jun. 30, 2016  (CN) .......................... 2016 1 0502468

(51) Int. Cl.
| | | |
|---|---|---|
| *B09B 3/00* | (2006.01) |
| *C22B 7/00* | (2006.01) |
| *C22B 3/44* | (2006.01) |
| *C01G 37/02* | (2006.01) |

(52) U.S. Cl.
CPC .......... *B09B 3/0016* (2013.01); *B09B 3/0083* (2013.01); *C01G 37/02* (2013.01); *C22B 3/44* (2013.01); *C22B 7/007* (2013.01); *Y02P 10/234* (2015.11); *Y02P 10/242* (2015.11)

(58) Field of Classification Search
CPC ....... C01G 37/02; C22B 7/007; B09B 3/0016; B09B 3/00831

USPC .................................................... 423/57, 595
See application file for complete search history.

(56) References Cited

U.S. PATENT DOCUMENTS

| 4,092,439 A * | 5/1978 | Demazeau ............. C01G 37/02 |
| | | 252/62.51 C |
| 5,093,089 A * | 3/1992 | Alford .................... C01B 11/14 |
| | | 423/184 |
| 2001/0048852 A1* | 12/2001 | Chowdhury ............. A62D 3/33 |
| | | 405/128.75 |
| 2004/0086438 A1* | 5/2004 | Sreeram ................... C22B 1/02 |
| | | 423/55 |

FOREIGN PATENT DOCUMENTS

| CN | 200710078681.3 | 2/2008 |
| CN | 200610135382.4 | 7/2008 |
| CN | 201510428141.8 | 11/2015 |
| CN | 201610502468.X | 10/2016 |
| GB | 522561 | 6/1940 |

OTHER PUBLICATIONS

Written Opinion of the International Search Authority (with English translation) for PCT/CN2016/108757, dated Mar. 20, 2017. 8 pages.
International Search Report and Written Opinion for PCT/CN2016/108757, dated Mar. 24, 2017. With English Translation. 12 pages.

* cited by examiner

*Primary Examiner* — Tima M. McGuthry-Banks
(74) *Attorney, Agent, or Firm* — Joseph E. Maenner; Maenner & Associates, LLC

(57) ABSTRACT

A treatment method for resource recycling of hexavalent chromium-containing residues is provided. This method comprises steps as follows: 1) adding water to the hexavalent chromium-containing residues and mixing uniformly; 2) adding mineralizers to a solution obtained in step 1) and stirring sufficiently to obtain a mixed liquid; and the mineralizers are sodium chlorate, sodium perchlorate and hydrochloric acid; 3) treating the mixed liquid by a hydrothermal method or direct heating; 4) after the heating treatment, naturally cooling a solid-liquid mixture to room temperature for holding; 5) separating solid residues and a chromium-containing supernatant, and washing filtered residues with water and then drying; and 6) recycling a chromium-containing solution for returning to a work section, or for a treatment of recycling chromium.

9 Claims, No Drawings

TREATMENT METHOD FOR RESOURCE RECYCLING OF HEXAVALENT CHROMIUM-CONTAINING RESIDUES

TECHNICAL FIELD

The present invention belongs to a field of a clean treatment and resource recycling of chromium-containing residues, and specifically relates to a treatment method for resource recycling of hexavalent chromium-containing residues.

BACKGROUND

A large amount of hexavalent chromium-containing residues can be produced in the production process in an industry of production and application of chromium salt. During transport and storage of chromium-containing residues, a large number of hexavalent chromium would be released gradually to the environment if the chromium-containing residues are subjected to weathering and soaking of rainwater for a long period, and it not only makes a serious pollution to the surroundings but also wastes a great deal of metal chromium resource.

At present, a core concept for the treatment method aiming at hexavalent chromium-containing residues is stockpiling or landfill after reductive immobilization of hexavalent chromium, mainly including wet detoxification, dry detoxification and biological treatment. For the wet detoxification, hexavalent chromium in the chromium-containing residues is leached into water phase by alkali or acid, and hexavalent chromium is reduced to trivalent chromium by adding a reductant to achieve detoxification. However, the reduced trivalent chromium will be oxidized to hexavalent chromium as the surroundings change, with incomplete detoxification, and it is difficult to apply the treated residues and takes lots of lands for stockpiling. For the dry detoxification, by calcination in a high-temperature reducing atmosphere, hexavalent chromium is reduced to trivalent chromium and enclosed in a sinter to achieve the purpose of detoxification, but such method needs a relatively high detoxification temperature (generally above 800 degrees) and the exhaust gas produced by calcination would generate a secondary pollution. It demands addition of an apparatus of removing smoke and dust, which results in an increased cost. The biological treatment has received more and more attention due to its advantages such as non-pollution and low cost. However, it still has several drawbacks, for example long activation time, low treating speed, and high consumption of organics and so on.

The methods described above only reduce and immobilize hexavalent chromium, and still chromium would be discharged to the environment. Not only the chromium resource cannot be recycled or utilized, but also the secondary pollution such as "yellowing" generates. Therefore, a relatively ideal method is to extract chromium from the chromium-containing residues and to reuse it in the industry, reducing the discharge of chromium from the source, turning waste into treasure, turning harm into good and achieving resources as the pollution is reduced.

CN patent "method of recycling hexavalent chromium resource from chromium-containing residues" (CN102191390A) collects the chromium resource by leaching water-soluble and acid-soluble hexavalent chromium with sulfuric acid or hydrochloric acid at normal temperature prior to reduction and precipitation. Although a recovery of chromium from the chromium-containing residues in such method can reach 60%-80%, part of hexavalent chromium still remains in the treated residues. Detoxification of chromium-containing residues is incomplete and it is difficult to comprehensively utilize the treated residues with an environmental hidden danger remained. CN patent "process for processing, recycling and reusing chromium-containing residues and effluent" (CN102699006A) nearly completely dissolves the chromium-containing residues with acid at normal temperature, then adds different precipitants respectively, and precipitates and separates mixed ions in the solution. Such method demands a big consumption of chemical reagents such as acid and precipitant, with complicated process and relatively high treatment cost.

SUMMARY OF THE INVENTION

An objective of the present invention is to provide a treatment method for resource recycling of hexavalent chromium-containing residues, aiming at drawbacks of the present technology of treating hexavalent chromium-containing residues. With simple process, low investment, quick effect and complete detoxification, this method can sufficiently extract hexavalent chromium and effectively control chromium pollution without a secondary pollution. Chromium extracted by this method can be reused in the production such as coating, pigment and papermaking, to realize turning waste into treasure. Filter residues obtained in the method can be used in industries such as rubber, plastic, fertilizer, paint, textile and papermaking.

The objective of the present invention is realized by the following technical solution.

A treatment method for resource recycling of hexavalent chromium-containing residues, comprises steps as follows:

1) adding water to the hexavalent chromium-containing residues and mixing uniformly;

2) adding mineralizers to a solution obtained in step 1) and stirring sufficiently to obtain a mixed liquid; and the mineralizers are sodium chlorate, sodium perchlorate and hydrochloric acid;

3) treating the mixed liquid obtained in step 2) by a hydrothermal method or direct heating;

4) naturally cooling a solid-liquid mixture obtained in step 3) to room temperature for holding;

5) separating solid residues and a chromium-containing supernatant, and washing filtered residues with water and then drying; and 6) recycling a chromium-containing solution for returning to a work section, or for a treatment of recycling chromium.

Further, a solid-to-liquid ratio after water is added to the hexavalent chromium-containing residues in step 1) is 1:0.5-1:10 (w/w).

Further, sodium chlorate in step 2) in the mixed liquid has a concentration of 0.1 mol/L-1 mol/L.

Further, sodium perchlorate in step 2) in the mixed liquid has a concentration of 0.1 mol/L-1 mol/L.

Further, the mixed liquid in step 2) has a pH value of 0.5-5.

Further, a temperature of the hydrothermal method or direct heating in step 3) is controlled between 30° C. and 250° C.

Further, a time for heat preservation in step 3) is 2 to 12 hours.

Further, a time for holding in step 4) is 0.5 to 48 hours.

Further, the treatment of recycling chromium in step 6) has specific steps as follows: adding a reductant to the chromium-containing solution, with hexavalent chromium in the solution being reduced to trivalent chromium, then adding a precipitant NaOH to generate precipitate of $Cr(OH)_3$, and finally calcining the precipitate of $Cr(OH)_3$ into $Cr_2O_3$.

A treatment method for resource recycling of hexavalent chromium-containing residues, comprises steps as follows:

(1) mixing the hexavalent chromium-containing residues with water uniformly in a solid-to-liquid ratio of 1:0.5-1:10 (w/w), then adding sodium chlorate, sodium perchlorate and hydrochloric acid, and adjusting the pH value to 0.5-5;

(2) stirring sufficiently to fully mix the residues with the solution;

(3) setting a temperature between 30° C. and 250° C., with the time for heat preservation of 2 to 12 hours;

(4) stopping heating to let the solution be cooled naturally, with the time for holding of 0.5 to 48 hours;

(5) after the hydrothermal treatment or the direct heating treatment, the solid residues precipitating at the bottom, while the supernatant having a relatively high concentration of hexavalent chromium;

(6) filtering and separating the solid residues and the chromium-containing supernatant, and washing, dewatering and drying the solid residues; and (7) the separated supernatant and the water with which the filtered residues are washed, may be returned to production, or subjected to a treatment of recycling chromium.

The present invention provides a treatment method for resource recycling of hexavalent chromium-containing residues, with its principle as follows:

Original residues mainly contain fine particles of calcium sulfate dihydrate which adsorb sodium chloride, sodium chromate and so on. In the present invention, when the mineralizers are added during the hydrothermal treatment or the direct heating treatment, hexavalent chromium in the chromium-containing residues is more likely to be dissolved in the water phase under an acidic condition. Whereas calcium sulfate recrystallizes in a solution of mineralizer, and the solid particles grow with a decreased specific surface area, achieving that hexavalent chromium is desorbed and separated from the particle surface.

After the original residues are subjected to the treatment of above methods, detoxified filtered residues are obtained of which a main component is calcium sulfate dihydrate. After the heating treatment, the treated reaction system is cooled naturally and subjected to aging for a period, rather than first separating the solid residues and the chromium-containing supernatant immediately. The reason of natural cooling is that if shock cooling is performed and a cooling speed is too fast, calcium sulfate hemihydrate which is stable at high temperature may rapidly turn into calcium sulfate dihydrate which is stable at low temperature, resulting in hardened slurry and caking which brings difficulties in the treatment process. Controlling a time for aging may regulate a growth extent of calcium sulfate crystals in the residues. If a particle size is relatively large, an adsorption ability of calcium sulfate for hexavalent chromium may be reduced, resulting in that it is more readily to wash and separate hexavalent chromium with a less water consumption for elution.

After the hydrothermal method or the direct heating treatment and the aging treatment, the particle size of calcium sulfate in the residues increases to some extent, and properties of the residues change as it, i.e. the absorption on the particle surface reduces and chromate ions are more likely to be desorbed and dissolved in water; meanwhile a specific gravity of particles increases, and the separation of solid and liquid becomes easier. Through the treatment of above methods, the detoxified residues are subjected to a chromium-leaching test according to national standard (HJ/T 299-2007 leaching toxicity method for solid waste-sulfuric-nitric process). A content of the leached hexavalent chromium is less than 3 mg/L and a content of total chromium is less than 9 mg/L, which are below the limit of national standard (HJ/T 301-2007) for general industrial solid residues. Major ions in the treated hexavalent chromium-containing supernatant are sodium ions, chloride ions, chlorate ions and chromate ions, which facilitate recycling to the production section.

Compared to the prior art, the present invention has following advantages and technical effects:

The present invention solves problems of hexavalent chromium-containing residues, such as difficult leaching process, high cost, difficult recycling of chromium and so on, and the supernatant from the treated residues is reused in the industrial production or making into chromium salt products. The content of leached hexavalent chromium from the treated residues is below the limit of national standard (HJ/T 301-2007) for general industrial solid residues, with high purity for using in industries such as rubber, plastics, fertilizer, paint, textile and papermaking. This method may achieve full-residue utilization with simple process, low cost, quick effect, large treating capacity and complete detoxification, and has relatively high social benefit and economic benefit.

DETAILED DESCRIPTION OF THE PREFERRED EMBODIMENT

The present invention is further described in connection with embodiments, but the implementations of the present invention are not limited by these.

Embodiment 1

1) 0.5 ton of hexavalent chromium-containing residues were added to a hydrothermal kettle, then water was added until a solid-to-liquid ratio was 1:1 (w/w), with sufficient stirring, and sodium chlorate, sodium perchlorate and hydrochloric acid were added, and a concentration of sodium chlorate in the system was adjusted to 0.5 mol/L, a concentration of sodium perchlorate was 1 mol/L and a pH value was 0.5. A temperature was set at 100° C. and a time for heat preservation was 2 hours.

2) 2 hours later, heating was stopped and the system was cooled naturally to room temperature and held for 24 hours.

3) After the holding, a supernatant solution containing hexavalent chromium was poured out. Residues which had been subjected to the hydrothermal treatment and holding were subjected to centrifugal washing and dewatering. Filtered residues were dried to obtain white solids or white and yellowish solids.

4) The chromium-containing solution was reused in the production, or collected in a waste water treatment station to perform restore, recycle and purification treatments. Reductants (such as sodium sulfide and sodium bisulfite) and precipitants (NaOH) were added to reduce the dissolved hexavalent chromium into trivalent chromium, and to generate precipitates of $Cr(OH)_3$, and the treated water could reach the national standard of drainage. During the whole process, water could be recycled in the system.

5) Final products were residues mainly containing calcium sulfate and chromic mud mainly containing $Cr(OH)_3$, respectively. The residues of calcium sulfate could be used as raw materials in industries such as rubber, plastics, fertilizer, pesticides, paint, textile and papermaking. The chromic mud could be calcined to $Cr_2O_3$ to realize recycling of chromium.

A concentration of the leached hexavalent chromium from the original chromium-containing residues in this embodiment was 265 mg/L, and a concentration of the leached hexavalent chromium from the treated chromium-containing residues was 1.31 mg/L.

Embodiment 2

1 ton of hexavalent chromium-containing residues were added to the hydrothermal kettle, then water was added until the solid-to-liquid ratio was 1:2 (w/w), with sufficient stirring, and sodium chlorate, sodium perchlorate and hydrochloric acid were added. The concentration of sodium chlorate in the system was adjusted to 1 mol/L, the concentration of sodium perchlorate was 0.5 mol/L and hydrochloric acid was added until the pH value was 5, with sufficient stirring, and the hydrothermal kettle was turned off. The temperature was set at 140° C. and the time for heat preservation was 5 hours. After the heating was stopped, the system was held for 48 hours. Other process was the same as that in the Embodiment 1.

The concentration of the leached hexavalent chromium from the original chromium-containing residues in this embodiment was 252 mg/L, and the concentration of the leached hexavalent chromium from the treated chromium-containing residues was 0.92 mg/L.

Embodiment 3

1 ton of hexavalent chromium-containing residues were added to the hydrothermal kettle, then water was added until the solid-to-liquid ratio was 1:5 (w/w), with sufficient stirring, and sodium chlorate, sodium perchlorate and hydrochloric acid were added. The concentration of sodium chlorate in the system was adjusted to 1 mol/L, the concentration of sodium perchlorate was 1 mol/L and hydrochloric acid was added until the pH value was 0.5, with sufficient stirring, and the hydrothermal kettle was turned off. The temperature was set at 30° C. and the time for heat preservation was 12 hours. After the heating was stopped, the system was held for 0.5 hour. Other process was the same as that in the Embodiment 1.

The concentration of the leached hexavalent chromium from the original chromium-containing residues in this embodiment was 269 mg/L, and the concentration of the leached hexavalent chromium from the treated chromium-containing residues was 0.72 mg/L.

Embodiment 4

1.5 tons of hexavalent chromium-containing residues were added to the hydrothermal kettle, then water was added until the solid-to-liquid ratio was 1:10 (w/w), with sufficient stirring, and sodium chlorate, sodium perchlorate and hydrochloric acid were added. The concentration of sodium chlorate in the system was adjusted to 0.5 mol/L, the concentration of sodium perchlorate was 0.1 mol/L and the pH value was 4, with sufficient stirring, and the hydrothermal kettle was turned off. The temperature was set at 240° C. and the time for heat preservation was 2 hours. After the heating was stopped, the system was held for 24 hours. Other process was the same as that in the Embodiment 1.

The concentration of the leached hexavalent chromium from the original chromium-containing residues in this embodiment was 274 mg/L, and the concentration of the leached hexavalent chromium from the treated chromium-containing residues was 0.86 mg/L.

Embodiment 5

2 tons of hexavalent chromium-containing residues were added to the hydrothermal kettle, then water was added until the solid-to-liquid ratio was 1:0.5 (w/w), with sufficient stirring, and sodium chlorate, sodium perchlorate and hydrochloric acid were added. The concentration of sodium chlorate in the system was adjusted to 0.1 mol/L, the concentration of sodium perchlorate was 0.5 mol/L and the pH value was 2, with sufficient stirring, and the hydrothermal kettle was turned off. The temperature was set at 80° C. and the time for heat preservation was 12 hours. After the heating was stopped, the system was held for 24 hours. Other process was the same as that in the Embodiment 1.

The concentration of the leached hexavalent chromium from the original chromium-containing residues in this embodiment was 278 mg/L, and the concentration of the leached hexavalent chromium from the treated chromium-containing residues was 0.91 mg/L.

The shorter the time for holding after the hydrothermal treatment or direct heating treatment, the smaller particles of the treated residues and the stronger re-adsorption ability to hexavalent chromium, and thus water that the washing demands will be more, resulting in a more difficult recycle. On the contrary, the longer the time for holding, the bigger particle size of the treated residues, and thus water for washing will be less, resulting in more convenient recycling of residues. However, if the time for holding is too long, the treated residues will turn yellowish which influences a treatment effect of the residues.

Similarly, technical solutions given according to the protection scope defined by the claims and the description may also give a plurality of embodiments which belong to the protection scope of the present invention.

What is claimed:

1. A treatment method for resource recycling of hexavalent chromium-containing residues, characterized in that, the treatment method comprises steps as follows:
    1) adding water to the hexavalent chromium-containing residues and mixing uniformly;
    2) adding mineralizers to a solution obtained in step 1) and stirring sufficiently to obtain a mixed liquid; and the mineralizers are sodium chlorate, sodium perchlorate and hydrochloric acid;
    3) treating the mixed liquid obtained in step 2) by a hydrothermal method or direct heating;
    4) naturally cooling a solid-liquid mixture obtained in step 3) to room temperature for holding;
    5) separating solid residues and a chromium-containing supernatant solution, and washing the separated solid residues with water and then drying; and
    6) recycling the chromium-containing supernatant solution for returning to a work section, or for a treatment of recycling chromium.

2. The treatment method for resource recycling of hexavalent chromium-containing residues according to claim 1, wherein a w/w solid-to-liquid ratio after water is added to the hexavalent chromium-containing residues in step 1) is 1:0.5-1:10.

3. The treatment method for resource recycling of hexavalent chromium-containing residues according to claim 1, wherein sodium chlorate in step 2) in the mixed liquid has a concentration of 0.1 mol/L-1 mol/L.

4. The treatment method for resource recycling of hexavalent chromium-containing residues according to claim 1, wherein sodium perchlorate in step 2) in the mixed liquid has a concentration of 0.1 mol/L-1 mol/L.

5. The treatment method for resource recycling of hexavalent chromium-containing residues according to claim 1, wherein the mixed liquid in step 2) has a pH value of 0.5-5.

6. The treatment method for resource recycling of hexavalent chromium-containing residues according to claim 1, wherein a temperature of the hydrothermal method or direct heating in step 3) is controlled between 30° C. and 250° C.

7. The treatment method for resource recycling of hexavalent chromium-containing residues according to claim 1, wherein a time for treating the mixed liquid in step 3) is 2 to 12 hours.

8. The treatment method for resource recycling of hexavalent chromium-containing residues according to claim 1, wherein a time for naturally cooling the solid-liquid mixture in step 4) is 0.5 to 48 hours.

9. The treatment method for resource recycling of hexavalent chromium-containing residues according to claim 1, wherein the treatment of recycling chromium in step 6) has specific steps as follows: adding a reductant to the chromium-containing solution, with hexavalent chromium in the solution being reduced to trivalent chromium, then adding a precipitant NaOH to generate precipitate of $Cr(OH)_3$, and finally calcining the precipitate of $Cr(OH)_3$ into $Cr_2O_3$.

\* \* \* \* \*